ELECTRICAL SWITCHING CIRCUITS

Filed July 2, 1957 4 Sheets-Sheet 1

INVENTOR
TERENCE BERNARD TOMLINSON
BY Kirschstein, Kirschstein & Ottinger
ATTORNEYS INVENTOR
Terence Bernard Tomlinson
BY [signature]
ATTORNEYS Aug. 16, 1960 T. B. TOMLINSON 2,949,538

ELECTRICAL SWITCHING CIRCUITS

Filed July 2, 1957 4 Sheets-Sheet 3

INVENTOR
TERENCE BERNARD TOMLINSON
BY Kirschstein, Kirschstein & Ottinger
ATTORNEYS Aug. 16, 1960 T. B. TOMLINSON 2,949,538

ELECTRICAL SWITCHING CIRCUITS

Filed July 2, 1957 4 Sheets-Sheet 4

INVENTOR

TERENCE BERNARD TOMLINSON

BY Kirschstein, Kirschstein & Ottinger

ATTORNEYS

United States Patent Office 2,949,538

Patented Aug. 16, 1960

2,949,538

ELECTRICAL SWITCHING CIRCUITS

Terence Bernard Tomlinson, Harrow, England, assignor to The General Electric Company Limited, London, England Filed July 2, 1957, Ser. No. 669,585

Claims priority, application Great Britain July 12, 1956

10 Claims. (Cl. 250—213)

Figure 1:
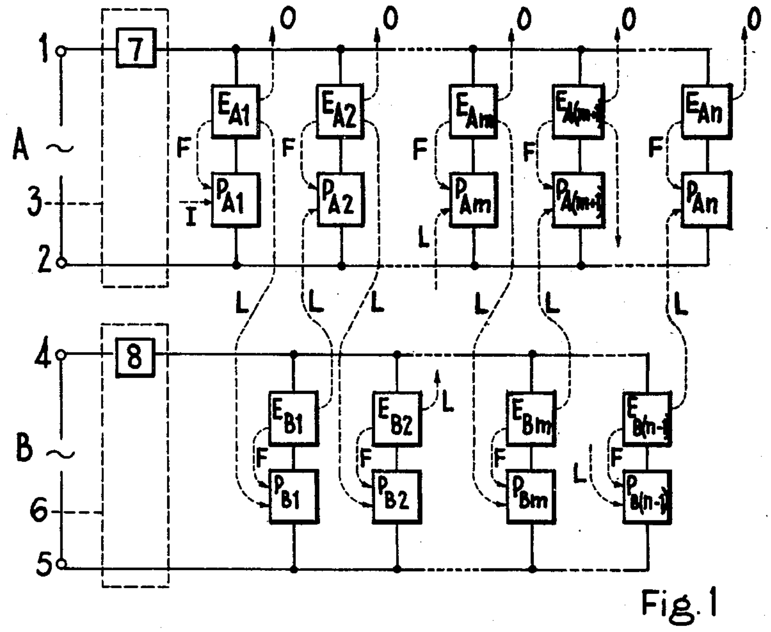

This invention relates to electrical switching circuits suitable for use in shift registers, counting circuits and like circuit arrangements designed to give an output which is dependent on the number or arrangement of incoming signals. The output may, for example, take the form of a visual display or be in the form of electrical signals, depending on the purpose for which the circuit arrangement is used.

Hitherto such switching circuits have usually made use of thermionic or cold-cathode valves, or electro-magnetic relays, for performing the switching operations.

However it has now been found that some switching actions can be produced by suitable arrangements of photoconductive and electroluminescent elements.

Thus, if a photoconductive element is connected to a suitable electrical supply in series with an electroluminescent element, the brightness of the latter element can be varied by a variation in the intensity of radiations within a particular range of wavelengths incident on the photoconductive element. By employing suitable materials for the photoconductive and electroluminescent elements such that the photoconductive element is responsive to radiations emitted by the electroluminescent element and by disposing the elements in such a way that at least part of the output of the electroluminescent element is fed back to the photoconductive element, then provided this feedback is of sufficiently high intensity it can be arranged that the series combination, hereinafter referred to for simplicity as an "electro-optical pair," has two stable conditions of equilibrium, namely a first stable condition when the photoconductive element is at a relatively high impedance and the electroluminescent element at relatively low brightness, and a second stable condition when the photoconductive element is at a relatively low impedance and the electroluminescent element at relatively high brightness.

An electroluminescent element which is excited to relatively high brightness will hereinafter be referred to as being "on," and an electroluminescent element which is in a state of relatively low brightness will be referred to as being "off," or "extinguished."

The applied voltage required to cause the electro-optical pair to take up the second stable condition, when the photoconductive element is non-illuminated from an external source, is much higher than that required to maintain it in this condition. Consequently if the applied voltage is less than said higher voltage but is greater than the maintaining voltage the electro-optical pair can be triggered into the second stable condition by radiations of suitable wavelength and of sufficiently high intensity incident on the photoconductive element, the pair staying in this second stable condition with the electroluminescent element "on" even after said incident radiations cease. The electro-optical pair will therefore remain in the second stable condition until the applied voltage is reduced to a value which is less than said maintaining voltage, the electro-optical pair then returning to the first stable condition with the electroluminescent element extinguished.

The object of the present invention is to provide an electrical switching circuit arrangement which makes use of a plurality of electro-optical pairs, as hereinbefore described, and which might have particular advantages in some forms of circuit arrangement of the kind referred to; for example such electro-optical pairs can be constructed with relatively small bulk and to have a relatively low power consumption.

According to the invention an electrical switching circuit arrangement includes an indicating circuit comprising a plurality of electro-optical pairs connected in parallel with each other between a pair of input terminals arranged to be connected for operation of the circuit to terminals of an electrical supply, a shift circuit comprising a plurality of electro-optical pairs connected in parallel with each other to a second pair of input terminals arranged to be connected for operation of the circuit to terminals of an electrical supply, the electro-optical pairs of the indicating and shift circuits being arranged alternately in a predetermined sequence with the photoconductive element of each electro-optical pair of the shift circuit arranged to receive part of the output radiation of the electroluminescent element of the preceding electro-optical pair of the indicating circuit, and the electroluminescent element of each electro-optical pair of the shift circuit arranged to direct part of its output radiation on to the photoconductive element of the succeeding electro-optical pair of the indicating circuit, the circuit also including voltage control means, responsive to shift signals, arranged normally to hold the voltage across each electro-optical pair of the indicating circuit at a value above, and across each electro-optical pair of the shift circuit at a value below, their respective maintaining voltages, and on the receipt of a shift signal to reduce the voltage across each electro-optical pair of the indicating circuit below, and increase the voltage across each electro-optical pair of the shift circuit above, their maintaining voltages for the duration of the signal, such that in operation of the arrangement, at the recipt of each shift signal, any electroluminescent element of the indicating circuit which is excited to relatively high brightness is extinguished, the "on" condition being transferred (except possibly in the case of the last electro-optical pair of the indicating circuit) to the electroluminescent element of the succeeding electro-optical pair of the shift circuit by virtue of the relatively low impedance of its photo-conductive element, and such that at the termination of the shift signal, said electroluminescent element of the shift circuit is returned to the "off" condition, the "on" condition being transferred to the electroluminescent element of the next electro-optical pair of the indicating circuit.

The higher voltage applied across the electro-optical pairs of the shift and indicating circuits should not of course be sufficiently great to cause the respective electroluminescent elements therein to be switched on in the absence of any external radiations on the corresponding series-connected photoconductive elements, and similarly the lower voltage should be such that the light-output of any electroluminescent element which is nominally switched off is appreciably lower than one which is in the "on" condition even though its series-connected photoconductive element is highly-conductive by virtue of its illumination by an adjoining electroluminescent element.

The electrical supply used for effecting the operation of the arrangement will depend on the nature of the electroluminescent material employed in forming the electroluminescent elements, and will, in general, be an alternating current supply since the most commonly employed electroluminescent materials, for example zinc sulphide and zinc-cadmium sulphide, exhibit luminescence when subjected to a varying electric field.

However some electroluminescent materials, in particular some materials in the form of single crystals, can be excited to luminescence when subjected to a unidirectional electric field, and where such materials are used in forming the electroluminescent elements, a direct current supply might then be employed.

Preferably the spectral responses of the photoconductive elements and electroluminescent elements have their maxima as near together as possible, the responses being narrow and overlapping as completely as can be obtained.

The photoconductive elements may be arranged to be sensitive to either visible or non-visible radiations by the use of suitable photoconductive materials, and the word "light" will hereinafter be used to mean the radiations to which the elements are sensitive whether they be visible or non-visible radiations.

Each electro-optical pair may conveniently be constructed as a unitary device by sandwiching superposed layers of suitable electroluminescent and photoconductive materials between two transparent conducting electrodes, the latter being conveniently formed as transparent conducting films on transparent insulating supports such as glass plates. Where glass plates are employed the conducting films may, for example, be formed by a technique involving the use of stannic or stannous chloride.

In some cases a photoconductive element may be formed as a single crystal of a suitable material such as cadmium sulphide. Such a crystal can be mounted on an electroluminescent element in the form of a small strip to provide an electro-optical pair of very small dimensions.

The shift signals may be in the form of electrical signals and the voltage control means may then be in the form of a simple electrically actuated switch arranged to connect the electro-optical pairs of the indicating circuit to a higher voltage source and those of the shift circuit to a lower voltage for maintaining the voltages across the electro-optical pairs of the indicating and shift circuits at a value above and at a value below the maintaining voltage respectively, and on the receipt of each shift signal is arranged to connect the electro-optical pairs of the indicating circuit to a lower voltage source and those of the shift circuit to a higher voltage source so as to reduce the voltage across the electro-optical pairs of the indicating circuit to a value below, and increase the voltage across the electro-optical pairs of the shift circuit to a value above, said maintaining voltage for the duration of the signal.

The lower voltage may in this case be zero. Thus the voltage control means may include a first pair of contacts in series with the electro-optical pairs of the indicating circuit with respect to the circuit input terminals, the contacts being arranged normally to be in the closed condition for maintaining the voltage across the electro-optical pairs of the circuit above the said maintaining voltage when the terminals are connected to a suitable voltage source, and a second pair of contacts in series with the electro-optical pairs of the shift circuit with respect to the circuit input terminals, these contacts being arranged normally to be in the open condition so that zero voltage is applied across the electro-optical pairs of that circuit, the arrangement being such that on the receipt of each shift signal the first pair of contacts are opened and the second pair of contacts are closed. By this means the voltage across the electro-optical pairs of the indicating circuit is reduced to zero and a voltage greater than the said maintaining voltage is applied across the electro-optical pairs of the shift circuit for the duration of each shift signal in operation of the arrangement.

However in some cases the shift signals may take the form of light pulses and the voltage control means may then consist of or include photoconductive elements, so connected and arranged as to vary the voltages across the elements of the indicating and shift circuits in the required manner in response to the light pulses.

For example in one form of the invention the voltage control means in each circuit may consist of a photoconductive element connected in series with all the electro-optical pairs of that circuit with respect to the circuit input terminals. Such an arrangement includes or is arranged to be associated with a shift signal generator arranged in the normal rest condition of the arrangement, to direct light of a suitably high intensity on to the voltage control element of the indicating circuit, and light of a lower intensity (which may be zero) on to the photoconductive voltage control element of the shift circuit so that with the same supply voltage applied to both circuits a higher voltage is applied across the electro-optical pairs of the indicating circuit than the shift circuit, the values of which voltages are above and below said maintaining voltage respectively. The shift signals are produced by controlling the output of the shift signal generator and take the form of temporary increases in the light incident on the protoconductive voltage control element in the shift circuit, which increases will hereinafter be referred to as "positive light pulses," with a simultaneous cutting-off or reduction in the light incident on the voltage control element in the indicating circuit, hereinafter referred to as "negative light pulses," giving rise to a reduction in the voltage applied across the latter circuit and an increase in the voltage applied across the shift circuit. The voltage control elements should of course be so constructed that the necessary voltage changes for operation of the circuit are obtained.

In an alternative arrangement a photoconductive voltage control element may be connected in series in one circuit, that is to say either the shift or indicating circuit, and a photoconductive voltage control element shunted across all the electro-optical pairs of the other circuit, the latter circuit also including an impedance in series with both the electro-optical pairs and the voltage control element with respect to the circuit input terminals. In such an arrangement the shift signal generator is arranged to direct light of such an intensity on to both photoconductivity voltage control elements that in the normal rest condition of the arrangement the voltage across the electro-optical pairs of the indicating circuit is maintained at a value above, and that across the electro-optical pairs of the shift circuit is maintained at a value below, the said maintaining voltage, the shift signals taking the form of either positive or negative light pulses as appropriate incident on both elements simultaneously for effecting the required changes in the voltages across the electro-optical pairs of the two circuits.

In some cases the shunt-connected photoconductive voltage control element may be replaced by a number of individual elements each connected directly across a corresponding electro-optical pair of the circuit, the said impedance also being replaced by the corresponding number of individual impedances each in series with a respective electro-optical pair and the associated voltage control element.

In a further arrangement the voltage control means in each circuit may consist of a photoconductive element shunting the electro-optical pairs of that circuit and in series with an impedance which is also in series with the electro-optical pairs with respect to the circuit input terminals, the shift signals being in the form of positive light pulses arranged to be incident on the photoconductive voltage control element of the indicating circuit only, the voltage control element of the shift circuit being so disposed as to receive part of the output of each electroluminescent element of the indicating circuit.

In use of such an arrangement the receipt of the positive light pulses by the photoconductive voltage control element of the indicating circuit reduces the voltage across the electro-optical pairs of that circuit below the said maintaining voltage, and the consequent reduction in the incident radiation on the photoconductive voltage control element of the shift circuit, due to the resultant extinguishing of the electroluminescent element or elements of the indicating circuit, causes the voltage across the electro-optical pairs of the shift circuit to be increased above the said maintaining voltage.

Other suitable means of obtaining the required variation in the voltages across the indicating and shift circuits can obviously be devised if desired.

One arrangement in accordance with the invention may be designed for use as a ring counter by employing the same number ($n$) of electro-optical pairs in the shift circuit as there are in the indicating circuit, with the output of the electroluminescent element of the $n$th electro-optical pair of the shift circuit arranged to be incident on the photoconductive element of the first pair in the indicating circuit. In such an arrangement only one of the electroluminescent elements in the indicating circuit is arranged to be "on" at a time during normal operation, and the arrangement is such that each shift signal causes the "on" condition to be transferred to the electroluminescent element of the next electro-optical pair of the indicating circuit, via the intervening electro-optical pair of the shift circuit, the "on" condition being transferred back to the electroluminescent element of the first electro-optical pair of the indicating circuit after reaching the $n$th pair.

An output may be taken from any one of the electroluminescent elements of the indicating circuit, for example by viewing the element directly, or by employing a subsidiary photoconductive element arranged to receive part of the output of that electroluminescent element, or by making use of the voltage changes appearing across the electroluminescent element in operation of the circuit.

A circuit arrangement according to the invention may alternatively be employed as a shift register, and in an arrangement of this kind, employing $n$ electro-optical pairs in the indicating circuit, only ($n$—) electro-optical pairs in the shift circuit are required since the "on" condition, after reaching the $n$th pair in the indicating circuit, is not transferred back to the first pair. The $n$th electro-optical pair can, however, be arranged to actuate a further circuit arrangement either optically or electrically as may be desired.

In a shift register constructed in accordance with the invention, in addition to the shift signals, input light pulses are arranged to be incident on the photoconductive element of the first electro-optical pair of the indicating circuit, these pulses being synchronized with the shift signals.

An incoming light pulse is arranged to register "1" on the indicating circuit by causing the electroluminescent element of the first electro-optical pair to be excited to high brightness, the absence of a pulse registering "0" by leaving the element in the "off" condition, the "on" or "off" condition being transferred to the next electro-optical pair of the circuit on the receipt of the following shift signal, and to the third electro-optical pair on the receipt of the subsequent shift signal. Thus all the digits in the system are caused to move one place along the chain of electro-optical pairs in the indicating circuit with each shift signal.

Outputs, either electrical or optical, may be taken from all of the electroluminescent elements in the indicating circuit, by employing the voltage changes across the elements, or subsidiary photoconductive devices, as may be desired.

Figure 2:
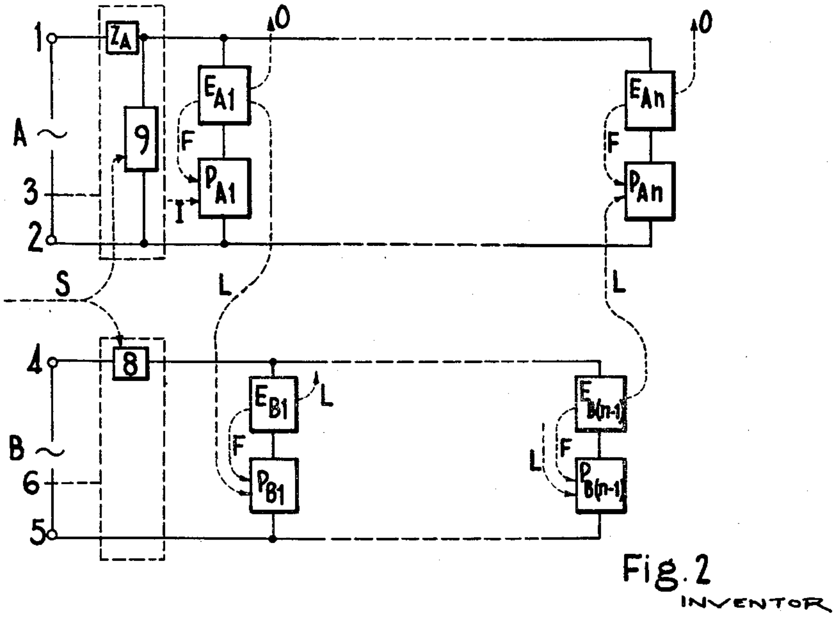
Figure 3:
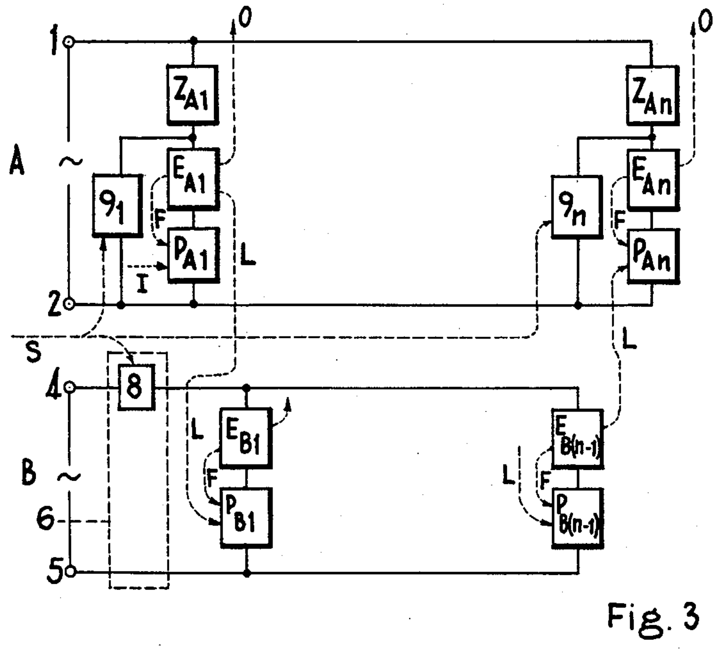
Figure 4:
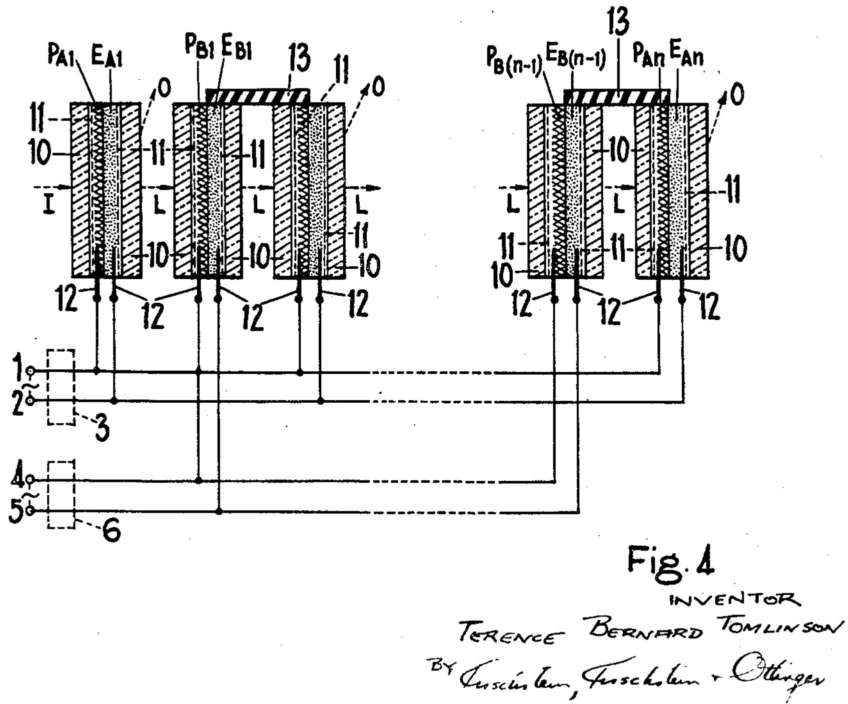
Figures 5, 6:
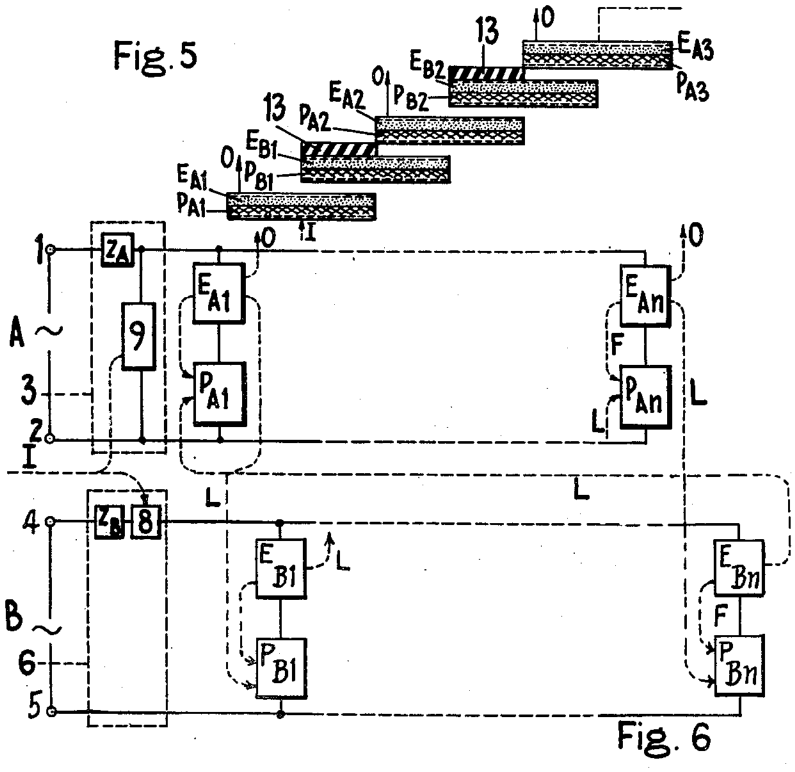
Figure 7:
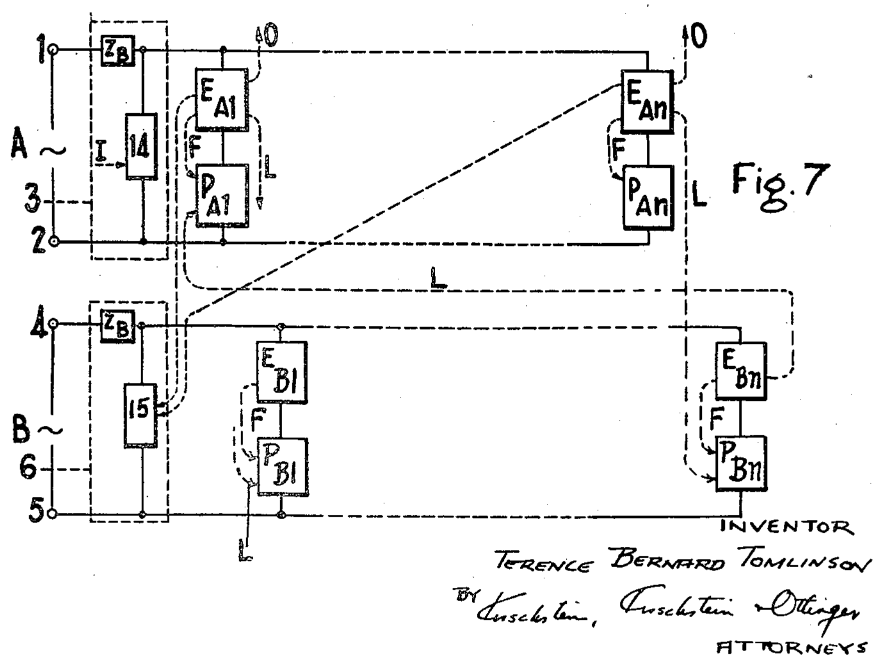
Figure 8:
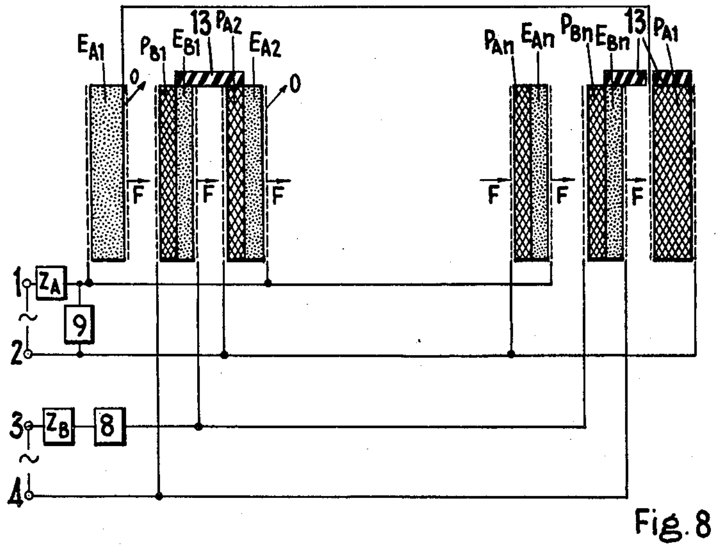
Figures 1A, 9:
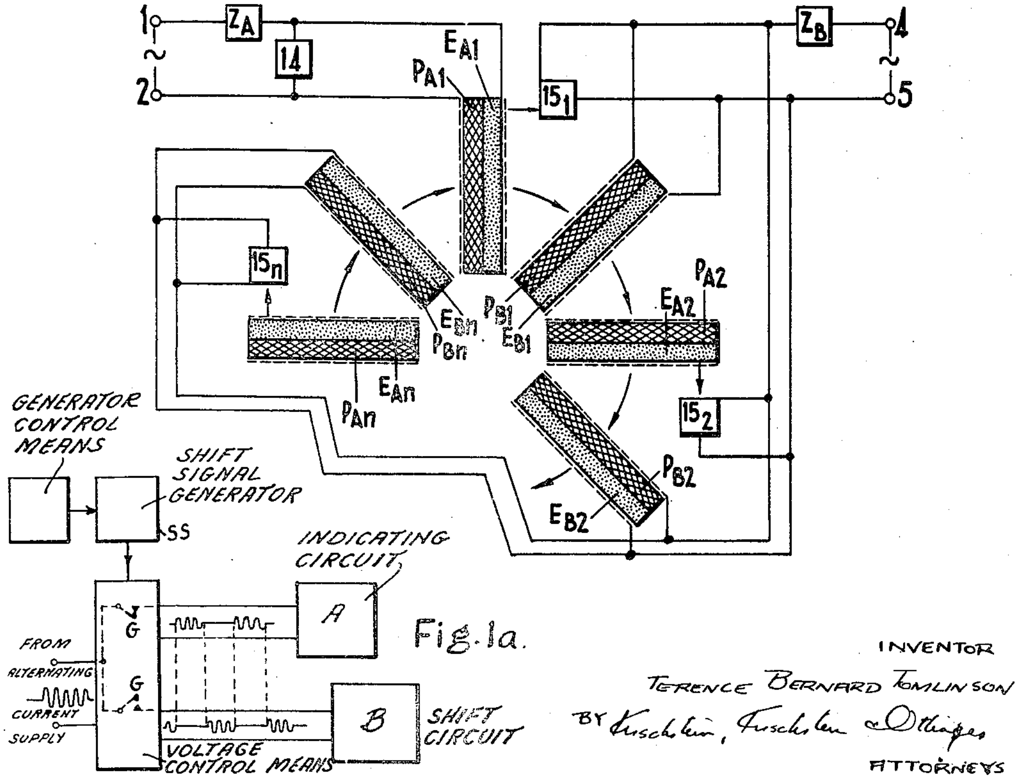

Several embodiments of the invention will now be described by way of example with reference to Figures 1 to 9 of the accompanying schematic drawings, in which Figures 1 to 3 represent detailed embodiments of three different shift register circuits in accordance with the invention represented more generally in diagrammatic form in Figure 1*a*, Figures 4 and 5 show two arrangements of unitary electro-optical devices for providing a shift register circuit arrangement as illustrated in Figure 1, Figures 6 and 7 represent two different ring counter circuits in accordance with the invention, and Figures 8 and 9 show arrangements of unitary electro-optical devices for providing respectively a ring counter circuit as shown in Figure 6, and a modified form of the ring counter circuit shown in Figure 7.

In all the above figures some of electro-optical pairs of the arrangements illustrated have been omitted for simplicity.

Referring to Figure 1 of the drawings, the arrangement shown therein includes an indicator circuit A comprising a plurality ($n$) of branch circuits connected in parallel with each other between two input terminals 1, 2 through voltage control means 3, the input terminals being arranged to be connected, in use of the arrangement, to an alternating current supply of constant root mean square voltage, and the voltage control means 3 being arranged to adjust the root mean square voltage applied across the branch circuits to either one of two values as will subsequently be explained.

Each branch circuit consists of a photoconductive element $P_{A1} \ldots P_{An}$ in series with a corresponding electroluminescent element $E_{A1} \ldots E_{An}$, the materials from which the latter are formed being excitable by a varying electric field, and giving an output when excited to which the materials forming the photoconductive elements are sensitive.

The photoconductive elements and electroluminescent elements are so arranged that light emitted by each of the latter elements is directed on to the photoconductive element in series with it as indicated by the broken lines F, and the arrangement is such that when the voltage applied across the branch circuits is at the higher of the said two values, light of suitable wavelengths and suitably high intensity directed on to the photoconductive element from an external source causes the electroluminescent element to be excited to relatively high brightness owing to the reduction in the impedance of the photoconductive element, the regenerative effect of the positive feedback of light from the electroluminescent element to the photoconductive element sending the latter into its most highly conducting condition with the electroluminescent element fully "on," and maintaining it in this condition even when the incident light from the external source ceases.

However, when the value of the voltage applied across the branch circuit is reduced to the lower of said two values, provided the light from the external source is no longer incident on the photoconductive element, the output of the electroluminescent element drops and is no longer sufficient to maintain the photoconductive element in the highly conductive state, and the impedance of the latter increases, thereby returning the electroluminescent element to the "off" condition.

Also included in the arrangement is a shift circuit B comprising ($n$—1) branch circuits connected in parallel with each other to two further input terminals 4, 5, arranged to be connected to an alternating current supply in use of the arrangement. Also included is a voltage control means 6 for adjusting the root means square voltage applied across the branch circuits to either one of two values in a similar manner to the control means 3. The two control means are so designed that when the root mean square voltage applied across the branches of the indicating circuit A has the higher of said two values, the root mean square voltage applied across the branches of the shift circuit B has the lower of said two values and vice versa.

Each of the branches of the shift circuit B comprises a photoconductive element $P_{B1} \ldots P_{B(n-1)}$ in series with a corresponding electroluminescent element $E_{B1} \ldots E_{B(n-1)}$ in a similar manner to the indicating circuit A and similarly constructed and arranged such that each photoconductive element is sensitive to and receives part of the output of its associated electroluminescent element. The elements of the two circuits are so disposed with respect to each other that part of the light emitted by each electroluminescent element $E_{Am}$ of the indicating circuit A, when it is excited to luminescence, is directed on to the photoconductive element $P_{Bm}$ of the shift circuit B, and part of the light emitted by each electroluminescent element $E_{Bm}$ of the shift circuit B, when excited, is incident on the photoconductive element $P_{A(m+1)}$ of the indicating circuit A. The light paths from the electroluminescent elements of each circuit to the associated photoconductive elements of the other circuit are represented by the broken lines L.

In the normal rest condition of the arrangement the voltage applied across the branches of the indicating circuit A is such that each electroluminescent element $E_{Am}$ which is in the "on" condition remains in that state owing to the positive feed-back between the element and the corresponding photoconductive element $P_{Am}$ whereas the electroluminescent elements of the shift circuit B are all extinguished. However, on the receipt of shift signals by the voltage control means, as will subsequently be explained, the voltage across the branches of the indicating circuit A is reduced to said lower value, which is insufficient to maintain the electroluminescent elements in the "on" condition, and the voltage across the branches of the shift circuit B is increased to the higher value; the reduced impedance of the photoconductive element $P_{Bm}$ caused by the light incident on it from the electroluminescent element $E_{Am}$ before the latter was extinguished results, because of its relatively slow response time, in the electroluminescent element $E_{Bm}$ being excited to luminescence, and the electroluminescent element $E_{Bm}$ being held in this condition owing to the positive feed-back to the photoconductive element $P_{Bm}$. At the termination of the shift signal, which is in the form of a pulse of sufficient duration to enable the circuit to settle down in this new condition, the voltages across the two sets of branch circuits revert to their original values, and the light from the electroluminescent element $E_{Bm}$ incident on the photoconductive element $P_{A(m+1)}$ causes the electroluminescent element $E_{A(m+1)}$ to be excited to full brightness, the electroluminescent element $E_{Bm}$ returning to the "off" condition.

Incoming digits to the shift register are arranged to take the form of light pulses (to register 1) or absence of pulses (to register 0) incident on the photoconductive element $P_{A1}$ in the indicating circuit A as indicated by the arrow I, these pulses being synchronised with the shift pulses.

When an incoming light pulse is received the element $P_{A1}$ is rendered highly conductive, and the electroluminescent element $E_{A1}$ is excited to high brightness at the termination of the corresponding shift pulse, the absence of a pulse leaving the element $E_{A1}$ extinguished, and on the receipt of the following shift pulse the "on" or "off" condition is transferred to the electroluminescent element $E_{A2}$ via the intervening electroluminescent element $E_{B1}$. The next shift pulse causes the "on" or "off" condition to be transferred to the electroluminescent element $E_{A3}$ and so on.

Thus with each shift pulse all the digits registered are moved one place along the chain of branches in the circuit. The last digit can be used to operate a further device or may be lost.

The state of the circuit can be seen at any instant by viewing the electroluminescent elements $E_A$ of the indicating circuit A, and electrical output signals may, if desired, be obtained from these elements either electro-optically, for example by directing part of their light output, represented by the broken lines O, on to subsidiary photoconductive elements (not shown), or by rectifying the alternating voltage appearing across each element.

The voltage control means 3 and 6 may consist of gating circuits through which the alternating current supply voltage is fed to the indicating and shift circuits, the same shift pulse being arranged to increase the voltage across the branch circuits of the shift circuit B via an "open" gate and reduce the voltage across the branches of the indicating circuit A by means of a shut gate; the general arrangement is illustrated in block form in Figure 1*a*, the gating circuits being represented diagrammatically for convenience by the switches G. The shift pulses may be in the form of electrical pulses supplied by a shift signal generator SS, and the gating circuits G may then take the form of an electrically-actuated switching arrangement, incorporating either electronic or mechanical switches, responsive to the electrical pulses. In an alternative arrangement the voltage control means are designed to be actuated optically and the shift pulses supplied by the shift signal generator SS are then arranged to take the form of light pulses.

Each of the voltage control means might, for example as shown in Figure 1, comprise a photoconductive element 7, 8 connected in one of the supply leads to the respective indicating or shift circuit, and being capable of passing sufficient current to maintain all the electroluminescent elements of that circuit in the "on" condition. In the rest condition of the arrangement the element 7 is continuously illuminated and has a relatively low impedance, whilst the element 8 is non-illuminated and has a relatively high impedance. The shift pulses take the form of positive light pulses incident on the element 8 and "negative" light pulses on the element 7, that is to say the illumination of the element is interrupted for the duration of the pulse. The shift pulses therefore produce an increase in the impedance of the element 7 and a decrease in the impedance of the element 8 and the voltages across the branches of the indicating and shift circuits are reduced and increased respectively for transferring the digits from the indicating circuit to the shift circuit as previously described. At the termination of the shift pulse the circuit arrangement returns to its original condition with the higher voltage applied across the branches of the indicating circuit A and the lower voltage across the branches of the shift circuit B, and the digits are transferred back to the electroluminescent elements of the indicating circuit but being all moved one place along the chain.

A modification of the latter arrangement is shown in Figure 2, the circuit being similar to that illustrated in Figure 1 except that the voltage control means 3 in the indicating circuit takes the form of a photoconductive element 9 shunted across the branch circuits and in series with a current limiting impedance $Z_A$ with respect to the supply, the impedance $Z_A$ also being in series with the branch circuits. With such an arrangement both the elements 8 and 9 are normally non-illuminated in the rest condition, a single positive light pulse represented by the arrows S simultaneously reducing the impedances of both elements 8, 9 and causing the voltage across the branches of the indicating circuit to be decreased whilst the voltage across the shift circuit is increased. The element 9 is capable of carrying a current at least several times the current taken by the individual branches of the indicating circuits when all the electroluminescent elements therein are in the "on" condition.

In a further modification of this arrangement which is illustrated in Figure 3, the photoconductive element 9 and impedance $Z_A$ are split up into a number of individual components $9_1 \ldots 9_n$ and $Z_A \ldots Z_{An}$ respectively, each of the photoconductive elements shunting a corresponding photoconductive element and electroluminescent element of a branch and each impedance being connected in series in that branch. The shift pulses S are arranged to be incident on all the elements simultaneously. This arrangement avoids the difficulty, encountered in the circuit arrangement shown in Figure 2, of the voltage across the branches being dependent on the number of electroluminescent elements which are in the "on" condition. If desired the photoconductive element in the shift circuit B may similarly be split up into a number of individual photoconductive elements each in series in a corresponding branch and all arranged to receive the shift pulses.

In another modification of the circuit arrangement shown in Figure 2 positive shift pulses may be applied to the photoconductive element 8 in the shift circuit B only, for bringing on the appropriate electroluminescent elements of that circuit, and all the latter elements being arranged to illuminate the photoconductive element 9 in the indicating circuit A for extinguishing the electroluminescent elements therein.

In the circuit arrangement illustrated in Figure 3 a similar arrangement can be produced by arranging that the output of each electroluminescent element $E_{Bm}$ of the shift circuit B is incident on the photoconductive element $9_m$ shunting the corresponding photoconductive and electroluminescent elements $P_{Am}$ and $E_{Am}$ respectively of the corresponding branch in the indicating circuit.

Resetting of any of the arrangements shown in Figures 1 to 3 or the modifications thereof described above may be effected by reducing the voltage across the branches of the indicating circuit A for extinguishing the electroluminescent elements therein, without a corresponding increase in the voltage across the branches of the shift circuit B, and this can be effected in any convenient manner, for example by opening a switch in series with both circuits with respect to the supply.

In any of the arrangements described each photoconductive and its associated electroluminescent element may conveniently be in the form of a unitary device consisting of superposed layers of suitable electroluminescent and photoconductive materials sandwiched between two transparent conducting electrodes as previously explained.

A suitable arrangement of such unitary devices for forming the circuit shown in Figure 1 is represented schematically in Figure 4, the photoconductive and electroluminescent layers of the devices being denoted by the same references as the photoconductive and electroluminescent elements in Figures 1 to 3. In each device the photoconductive and electroluminescent layers are sandwiched as previously described between two glass plates 10 coated on their inner surfaces with thin transparent conducting films 11 formed by contacting the heated glass surface with the vapour of stannic chloride in the presence of moisture. Strips of metal foil 12 connected electrically to the film 11, for example by means of a conducting adhesive, before the formation of the photoconductive and electroluminescent layers, project beyond the edges of the glass plates 10 and provide means of establishing electrical contacts with the films.

The devices are arranged in alignment with each other, as shown, with the devices of the shift circuit interposed between the devices of the indicating circuit, the device including the photoconductive element $P_{B1}$ and the electroluminescent element $E_{B1}$ being located next to the device including the photoconductive and electroluminescent elements $P_{A1}$ and $E_{A1}$ respectively, with the output of the electroluminescent element $E_{A1}$ incident on the photoconductive element $P_{B1}$. The output of the electroluminescent element $E_{B1}$ is arranged to be incident on the photoconductive element $P_{A2}$ and so on.

The devices forming the indicating circuit are arranged so that part of their electroluminescent elements are visible for enabling output signals to be obtained, but the electroluminescent elements of the shift circuit are masked off at 13. The whole arrangement could, for example, be located within a suitable case with transparent windows through which light emitted by the electroluminescent elements of the indicating circuit could emerge, and through which light pulses from an external source could be directed on to the photoconductive element $P_{A1}$ of the first device of the indicating circuit.

A further arrangement of the unitary photoconductive electroluminescent devices is shown in Figure 5, the devices being arranged in echelon form with the electroluminescent layers of the shift circuit again being masked off at 13; the same reference numerals are used for the different parts of the devices in this figure as in Figure 4, the glass plates 10, the contacts 12 and the circuit connections being omitted for simplicity.

It will be appreciated that in order for the digit to pass in the forward direction only, in the arrangements illustrated in Figures 4 and 5 it is necessary for light from any electroluminescent element of the shift circuit (say $E_{Bm}$), which falls on the preceding photoconductive element ($P_{Am}$) of the indicating circuit to be greatly attenuated compared with light falling on the succeeding photoconductive element ($P_{Am(+1)}$) of the indicating circuit. This requires a high absorption of light by the photoconductive layer $P_{Bm}$ and by the electroluminescent layer $E_{Am}$ (that is the equivalent of one complete cell thickness). In general the layers will be found to give adequate absorption, although as a further safe-guard each electro-optical pair may have its electroluminescent element divided into two sections connected electrically in parallel. The photoconductive element of the pair, which can conveniently be a single crystal as aforesaid, on account of its small size, is then mounted directly on one section of the electroluminescent element, and the second section of the element is arranged directly opposite the succeeding photoconductive element of the opposite circuit. With suitable optical screening the possibility of digits passing in the reverse direction can thus be prevented completely.

An alternative circuit arrangement for operation as a ring counter is shown in Figure 6. This is similar to the arrangement shown in Figure 2 except that the shift circuit B has the same number (*n*) of branches as the indicating circuit A, the output of the electroluminescent element $E_{Bn}$ of the former being incident on the photoconductive element $P_{A1}$ of the latter, and an impedance $Z_B$ is also connected in series with the shift circuit as shown.

In the normal state of rest of the arrangement only one of the electroluminescent elements $E_{Am}$ of the indicating circuit A is "on" at a time, all those of the shift circuit B being extinguished. Input light pulses, represented by I, correspond to the shift pulses of Figure 2, and are arranged to reduce the voltage across the branches of the indicating circuit A and simultaneously to increase the voltage across those of the shift circuit B, each said pulse being arranged to transfer the "on" condition to the electroluminescent element $E_{Bm}$ of the shift circuit, and the termination of the pulse resulting in the transfer of the "on" condition to the electroluminescent element $E_{A(m+1)}$ of the indicating circuit. The "on" condition therefore moves along one place in the indicating circuit A with each input pulse, the "on" condition returning to the first branch of the chain after reaching the electroluminescent element $E_{An}$ of the last branch.

An electrical output is taken from any one electroluminescent element in the indicating circuit A, for example by means of a subsidiary photoconductive element or by using the change in voltage produced across the electroluminescent element, and there is one output pulse for every *n* input pulse.

The values of the impedances $Z_A$, $Z_B$ are arranged to be such that in each circuit only one of the electroluminescent elements can be in the "on" condition at any one time, since this gives a more reliable switching action in operation of the arrangement.

A modification of the circuit arrangement shown in Figure 6 is illustrated in Figure 7, the voltage control means in the indicating and shift circuits each consisting of a photoconductive element 14 and 15 respectively shunted across the branches of the circuit, the impedances $Z_A$, $Z_B$ respectively being connected in series with each of the elements 14, 15 with respect to the supply.

Input light pulses are arranged to be incident on the photoconductive element 14 across the indicating circuit A only, and the output of all the electroluminescent elements of this circuit is arranged to be directed on to the photoconductive element 15, such that an increase in the brightness of any electroluminescent element of the indicating circuit A reduces the impedance across the branches of the shift circuit B and extinguishes the electroluminescent elements therein.

If desired in a modified form of this last arrangement the photoconductive element 15 may be split up into $n$ separate photoconductive elements connected in parallel with each other across the electro-optical pairs of the shift circuit B and each exposed to the output of a different one of the electroluminescent elements $E_{A1} \ldots E_{An}$ of the indicating circuit.

Figure 8 shows a ring counter arrangement formed of a number of unitary photoconductive electroluminescent devices of the kind already described, the different parts of the devices being denoted by the same references as in Figures 4 and 5, and the glass plates 10 and contacts 12 again being omitted for simplicity. In this arrangement the devices are arranged in alignment with each other, the electroluminescent element $E_{A1}$ and photoconductive element $P_{A1}$, however, being formed separately as shown, and arranged one at each end of the row of devices so that the light from the element $E_{A1}$ is incident on the photoconductive element $P_{B1}$, and element $P_{A1}$ receives light from the electroluminescent element $E_{Bn}$. The output from the electroluminescent elements of the shift circuit is again masked at 13 as in the shift register arrangements shown in Figures 4 and 5.

In an alternative arrangement the individual devices may be arranged in the form of a ring as shown in Figure 9, this arrangement employing the modified form of the circuit shown in Figure 7 with the photoconductive voltage control element 15, which is connected across the branches of the shift circuit in that figure, split up into a number ($n$) of individual photoconductive elements $15_1 \ldots 15_n$ each arranged to receive light from a corresponding electroluminescent element of the indicating circuit. In this arrangement the switching on of any electroluminescent element $E_{Am}$ of the indicating circuit reduces the impedance of the corresponding photoconductive element $15_m$, and results in the reduction in the voltage across the branches below the value necessary for maintaining the electroluminescent elements therein in the "on" condition.

It will be appreciated that a switching circuit in accordance with the invention is not restricted for use in ring counters and shift registers as particularly described by way of example, but may equally well be applied to many other forms of circuit arrangement required to be switched to any one of a number of conditions, in dependence on input signals.

I claim:

1. An electrical switching circuit arrangement including a first pair of circuit input terminals arranged to be connected for operation of the circuit to terminals of an electrical supply, a second pair of circuit input terminals arranged to be connected for operation of the circuit to terminals of an electrical supply, an indicating circuit comprising a plurality of electro-optical pairs connected in parallel with each other between said first pair of circuit input terminals, a shift circuit comprising a pluralty of electro-optical pairs connected in parallel with each other to the second pair of circuit input terminals, each electro-optical pair comprising a photo-conductive element and an electroluminescent element, the electro-optical pairs of the indicating and shift circuits being arranged alternately in a predetermined sequence with the photoconductive element of each electro-optical pair of the shift circuit arranged to receive part of the output radiation of the electroluminescent element of the preceding electro-optical pair of the indicating circuit, and the electroluminescent element of each electro-optical pair of the shift circuit arranged to direct part of its output radiation on to the photo-conductive element of the succeeding electro-optical pair of the indicating circuit, the electrical circuit also includng voltage control means, responsve to shift signals, normally holding the voltage across every electro-optical pair of the indicating circuit at a value above, and the voltage across every electro-optical pair of the shift circuit at a value below, their respective maintaining voltages, the voltage control means being operable in response to the receipt of each shift signal to reduce the voltage across every electro-optical pair of the indicating circuit below, and increase the voltage across every electro-optical pair of the shift circuit above, their maintaining voltages for the duration of the signal for extinguishing any electroluminescent element of the indicating circuit which is excited to relatively high brightness and transferring the "on" condition to the electroluminescent element of the succeeding electro-optical pair of the shift circuit, and being operable to return the voltage across every electro-optical pair of the indicating circuit to a value above, and the voltage across every electro-optical pair of the shift circuit to a value below, their respective maintaining voltages at the termination of each shift signal for returning said electroluminescent element of the shift circuit to the "off" condition, and transferring the "on" condition to the electroluminescent element of the next electro-optical pair of the indicating circuit.

2. An electrical switching circuit arrangement as set forth in claim 1 wherein the voltage control means comprises electrically actuated switch means normally connecting the electro-optical pairs of the indicating circuit to a higher voltage source and those of the shift circuit to a lower voltage source, for maintaining the voltages across the electro-optical pairs of the indicating and shift circuits at a value above and at a value below the maintaining voltage respectively, and operable in response to the receipt of each electrical shift signal to connect the electro-optical pairs of the indicating circuit to a lower voltage source and those of the shift circuit to a higher voltage source so as to reduce the voltage across the electro-optical pairs of the indicating circuit to a value below and increase the voltage across the electro-optical pairs of the shift circuit to a value above, said maintaining voltage, for the duration of the signal.

3. An electrical switching circuit arrangement as set forth in claim 2 wherein the switch means includes a first pair of contacts in series with the electro-optical pairs of the indicating circuit with respect to the first circuit input terminals, and which contacts are normally held in the closed condition for maintaining the voltage across the electro-optical pairs of the indicating circuit above the said maintaining voltage, and a second pair of contacts in series with the electro-optical pairs of the shift circuit with respect to the second circuit input terminals, and which contacts are normally in the open condition so that zero voltage is applied across the electro-optical pairs of the shift circuit, the switch means being operable in response to the receipt of each shift signal to open the first pair of contacts and close the second pair of contacts for the duration of the signal.

4. An electrical switching circuit arrangement as set forth in claim 1 wherein the voltage control means comprises photoconductive elements responsive to shift signals in the form of light pulses, and connected to the indicating and shift circuits for controlling the voltages across the electro-optical pairs of said circuits in response to said light pulses.

5. An electrical switching circuit arrangement as set forth in claim 4 wherein the voltage control means comprises in each of the indicating and shift circuits a photoconductive element connected in series with all the electro-optical pairs of that circuit with respect to the input terminals for that circuit, and the arrangemen includes a shift signal generator having a normal rest condition in which it directs light of a suitably high intensity on to the photoconductve voltage control element of the indicating circuit and light of a lower intensity on to the photoconductive voltage control element of the shift circuit so as to maintain the voltage across the electro-optical pairs of the indicating circuit at a value above, and the voltage across the electro-optical pairs of the shift circuit at a value below, the said maintaining voltage, and means for controlling the output of the shift signal generator so as to produce shift signals in the form of positive light pulses incident on the photoconductive voltage control element of the shift circuit and negative light pulses incident on the photoconductive voltage control element of the indicating circuit, for increasing the voltage applied across the electro-optical pairs of the shift circuit above, and reducing the voltage applied across the electro-optical pairs of the indicating circuit below, said maintaining voltage respectively.

6. An electrical switching circuit arrangement as set forth in claim 4 wherein the voltage control means comprises a photoconductive means connected in series with all the electro-optical pairs of one of the shift circuit and the indicating circuit, and another photoconductive means shunted across all the electro-optical pairs of the other circuit, each with respect to the circuit input terminals, and an impedance means connected in series with the photoconductive voltage control means and the electro-optical pairs of said other circuit with respect to the input terminals of that circuit, and the arrangement includes a shift signals generator having a normal rest condition in which it directs light of a controlled intensity on to both the photoconductive voltage control means for holding the voltage across the electro-optical pairs of the indicating circuit at a value above, and that across the electro-optical pairs of the shift circuit at a value below, the maintaining voltage, and means for controlling the output of the shift signal generator so as to produce shift signals in the form of appropriate variations in the light incident on both photoconductive voltage control means simultaneously for effecting an increase in the voltage applied across the electro-optical pairs of the shift circuit above, and a reduction in the voltage across the electro-optical pairs of the indicating circuit below, the said maintaining voltage.

7. An electrical switching circuit arrangement as set forth in claim 6 wherein the photoconductive voltage control means which is shunted across the electro-optical pairs of the other circuit includes a number of individual photoconductive elements each responsive to the light pulse shift signals and each connected directly across a corresponding electro-optical pair of that circuit, and the impedance means includes a corresponding number of individual impedances each in series with a respective electro-optical pair and its associated voltage control element, but not the other electro-optical pairs and their associated voltage control elements.

8. An electrical switching circuit arrangement as set forth in claim 4 wherein the voltage control means comprises in each of the indicating and shift circuits a photoconductive element shunting the electro-optical pairs of that circuit, and there is included in each circuit an impedance in series with the electro-optical pairs of that circuit and the associated photoconductive voltage control element with respect to the input terminals of that circuit, the photoconductive voltage control element of the shift circuit being so disposed as to receive part of the output of each electroluminescent element of the indicating circuit, and the arrangement including a shift signal generator having a normal rest condition in which it directs a low intensity light output on to the photo-conductive voltage control element of the indicating circuit for holding the voltage across the electro-optical pairs of the indicating circuit at a value above said maintaining voltage, and in which the radiations incident on the photoconductive voltage control element of the shift circuit from the excited electroluminescent element or elements of the indicating circuit maintain the voltage across the electro-optical pairs of the shift circuit at a value below the said maintaining voltage, and having an operating condition in which it produces shift signals in the form of positive light pulses incident on the photoconductive voltage control element of the indicating circuit for reducing the voltage across the electro-optical pairs of the indicating circuit below the said maintaining voltage, and for increasing the voltage across the electro-optical pairs of the shift circuit above the said maintaining voltage in response to the reduction in the incident radiations on the photoconductive voltage control element of the shift circuit.

9. An electrical switching circuit arrangement as set forth in claim 1 suitable for use as a ring counter, said arrangement including the same number of electro-optical pairs in the shift circuit as in the indicating circuit, and wherein the photoconductive element of the first electro-optical pair of the indicating circuit is disposed so as to receive at least part of the output of the electroluminescent element of the last electro-optical pair of the shift circuit.

10. An electrical switching circuit arrangement according to claim 1 suitable for use as a shift register, said arrangement including $n$ electro-optical pairs in the indicating circuit and $n-1$ electro-optical pairs in the shift circuit, the arrangement further including means for supplying shift signals, and means for directing input light pulses in response to input signals on to the photoconductive elements of the first electro-optical pair of the indicating circuit, each in synchronism with a said shift signal.

References Cited in the file of this patent

Loebner: "Opto-Electronic Devices and Networks," Proceedings of the I.R.E., vol. 43, No. 12, pages 1897 to 1906, December, 1955.

Ballentyne: "Electroluminescence," Wireless World, March, 1957, pages 128 to 132.

Ballentyne: "The Phenomenon of Electroluminescence and its Application in the Electronics Industry," Marconi Review vol. XIX, No. 123, 4th Qtr., 1956, pages 160 to 175.

Tomlinson: "Principles of the Light-Amplifier and Allied Devices," Journal British I.R.E., March 1957, pages 141 to 154.